(12) United States Patent
Yoshimura

(10) Patent No.: US 9,645,392 B2
(45) Date of Patent: May 9, 2017

(54) VEHICLE EXTERIOR IMAGING APPARATUS

(71) Applicant: FUJI JUKOGYO KABUSHIKI KAISHA, Tokyo (JP)

(72) Inventor: Naohide Yoshimura, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 14/149,480

(22) Filed: Jan. 7, 2014

(65) Prior Publication Data

US 2014/0192410 A1 Jul. 10, 2014

(30) Foreign Application Priority Data

Jan. 10, 2013 (JP) ................. 2013-002262

(51) Int. Cl.
*G02B 27/00* (2006.01)
*B60R 11/04* (2006.01)

(52) U.S. Cl.
CPC .......... *G02B 27/0006* (2013.01); *B60R 11/04* (2013.01)

(58) Field of Classification Search
CPC .. G02B 27/006; G02B 27/0006; G02B 23/16; G02B 23/2476; B60R 1/0602; B60R 1/00; B60R 11/04; B60R 21/01538; B05B 1/267; B05B 1/00; B05B 12/02; B05B 1/08; B05B 15/10; B60S 1/0844; B60S 1/56; B60S 1/0848; B60S 1/52; B60S 1/54; B60S 1/02; B60S 3/04; G03B 17/02; G03B 11/043; G03B 11/041; G03B 11/045; H04N 5/2171; H04N 5/2254; H04N 5/2257; H04N 5/23203; H04N 7/185; G03F 7/70925; G06T 7/0002; H01H 25/065; B08B 3/02; B08B 3/024; B08B 3/04; B08B 5/02; B08B 9/093; B08B 1/008; G06K 9/00805;

(Continued)

(56) References Cited

U.S. PATENT DOCUMENTS 5,406,413 A * 4/1995 Mogamiya .................... 359/511
2011/0073142 A1* 3/2011 Hattori et al. .............. 134/56 R

FOREIGN PATENT DOCUMENTS

JP 2008176207 A * 7/2008
JP 2009-220719 A 10/2009

* cited by examiner

*Primary Examiner* — Scott J Sugarman
*Assistant Examiner* — Ibrahima Diedhiou
(74) *Attorney, Agent, or Firm* — McDermott Will & Emery LLP

(57) ABSTRACT

A vehicle exterior imaging apparatus includes a photo-receiving element, a transparent member that is disposed on a front face of the photo-receiving element and introduces light into it, and a movable body movable between a covering position for covering part or all of a front face of the transparent member with the movable body being spaced apart from the transparent member, and an evacuated position evacuating from the front face of the transparent member with respect to the covering position. The movable body has a higher surface wettability in a portion opposing to the transparent member at the covering position than the one of the front face of the transparent member. The movable body evacuates water adhered to the surface of the transparent member in a moving direction of the movable body during the movement of the movable body from the covering position to the evacuated position.

14 Claims, 10 Drawing Sheets

(58) Field of Classification Search
CPC ............. A47L 2501/20; A47L 15/0028; A47L
15/0031; A47L 15/16; A47L 15/18; A47L
2201/06; A47L 2401/00; A47L 2401/26
USPC ...................... 359/509, 511, 507; 239/284.1;
134/56 R, 104.2, 105, 198, 95.3, 18,
134/103.2, 103.3; 15/250.01, 214,
15/250.001, 250.04; 396/448, 535;
348/148
See application file for complete search history.

VEHICLE EXTERIOR IMAGING APPARATUS

CROSS-REFERENCE TO RELATED APPLICATION(S)

The application claims priority from Japanese Patent Application No. 2013-002262 filed on Jan. 10, 2013, the entire contents of which are hereby incorporated by reference.

BACKGROUND

1. Technical Field

The present disclosure relates to a vehicle exterior imaging apparatus for capturing an image of an environment around a vehicle mounting the apparatus.

2. Related Art

Conventionally, vehicles have been known which are mounted with a camera apparatus for capturing an image of the front, rear, or side of the vehicle which assists various driver's operations by, for example, displaying an image captured by the camera apparatus on a monitor, or analyzing an environment outside the vehicle based on the captured image to control traveling of the vehicle.

When installing such a camera apparatus in the exterior of the vehicle, foreign substances such as water drops and dirt may adhere to the lens. Thus, difficulty may occur in accurately recognizing the environment outside the vehicle and cause inconveniences in assisting the driver's operation. Therefore, for example, as disclosed in Japanese Unexamined Patent Application Publication (JP-A) No. 2009-220719, a camera apparatus having a washer device for discharging washer fluid to remove adhered foreign substances on the lens is provided. This enables the environment outside the vehicle to be accurately recognized.

However, according to the camera apparatus disclosed in JP-A No. 2009-220719, the washer fluid discharged to remove the adhered foreign substances may remain on the lens, and the monitored image may degrade due to the remained washer fluid. Further, if the washer fluid is discharged every time the adhered foreign substance is to be removed, the washer fluid requires a frequent re-fill, and maintenance may become troublesome. Moreover, when the washer fluid is short, the adhered foreign substances may not be removed.

A wiper may be provided to remove the adhered foreign substances on the lens. However, because such a wiper is generally made of rubber, its components must be replaced periodically, which still makes the maintenance become troublesome. Further, in a camera apparatus applying a curved lens such as a wide-angle lens, the wiper needs to conform to the curved surface, and thus the removal of the adhered foreign substance is difficult.

SUMMARY OF THE INVENTION

The present disclosure is made in view of the above situations, and an object thereof is to provide a vehicle exterior imaging apparatus that reduces a frequency of maintenance while surely removing foreign substances adhered to a lens thereof.

An aspect of the present disclosure provides a vehicle exterior imaging apparatus including: a photo-receiving element; a transparent member disposed on a front face of the photo-receiving element, the transparent member being configured to introduce light into the photo-receiving element; and a movable body movable between a covering position in which the movable body covers part or all of a front face of the transparent member in a state where the movable body is spaced apart from the transparent member with a gap, and an evacuated position in which the movable body is evacuated from the front face of the transparent member with respect to the covering position. The movable body has a higher surface wettability at least in a portion thereof opposing to the transparent member at the covering position than the surface wettability of the front face of the transparent member. The movable body evacuates water adhered to the surface of the transparent member in a moving direction of the movable body during the movement of the movable body from the covering position to the evacuated position.

The transparent member may be a convex lens.

The apparatus may further include an adherence determiner for determining an adhered state of a foreign substance containing water on the front face of the transparent member, and a movement controller for, when the adherence determiner determines that the foreign substance is adhered to the front face of the transparent member, moving the movable body from the evacuated position to the covering position and then resuming the movable body from the covering position to the evacuated position.

The apparatus may further include a washer for discharging washer fluid on the front face of the transparent member. When the adherence determiner determines that the foreign substance is adhered to the transparent member, the movement controller may move the movable body from the evacuated position to the covering position and then resume the movable body from the covering position to the evacuated position. After the movable body is moved, the adherence determiner may again determine the adhered state of the foreign substance, and when it is determined that the adhered foreign substance is adhered to the transparent member, the washer may discharge the washer fluid, and the movement controller may again move the movable body from the evacuated position to the covering position and then resume the movable body from the covering position to the evacuated position.

The apparatus may further include a washer for discharging the washer fluid to the front face of the transparent member. The adherence determiner may determine to identify that the adhered foreign substance is water or dirt. When the adherence determiner determines that the dirt is adhered to the transparent member, the washer may discharge the washer fluid, and the movement controller may move the movable body from the evacuated position to the covering position and then resume the movable body from the covering position to the evacuated position.

The adherence determiner may determine the adhered state of the foreign substance based on image data captured sequentially, and identify to be water or dirt based on a brightness of an image area where the adhered state is determined.

When the washer fluid is discharged by the washer, the movement controller may start moving the movable body from the evacuated position to the covering position after the discharge of the washer fluid is started, and the movement controller may resume the movable body from the covering position to the evacuated position after the discharge of the washer fluid is finished.

BRIEF DESCRIPTION OF DRAWINGS

The present disclosure is illustrated by way of example and not by way of limitation in the figures of the accompanying drawings, in which the like reference numerals indicate like elements and in which.

DETAILED DESCRIPTION

Hereinafter, a preferable implementation of the present disclosure is described in detail with reference to the accompanying drawings. Dimensions, materials, and any other particular numerical values illustrated in this implementation are merely examples for easier understanding of this implementation. Unless the dimensions, materials, and any other particular numerical values are particularly described, they are not to limit the present disclosure. Note that, in the present specification and the accompanying drawings, same numerals and characters are assigned to elements having substantially the same function and configuration so that repeating descriptions are omitted, and illustrations of elements which are not directly relevant to this implementation are omitted.

Imaging Apparatus 1

Figure 1:
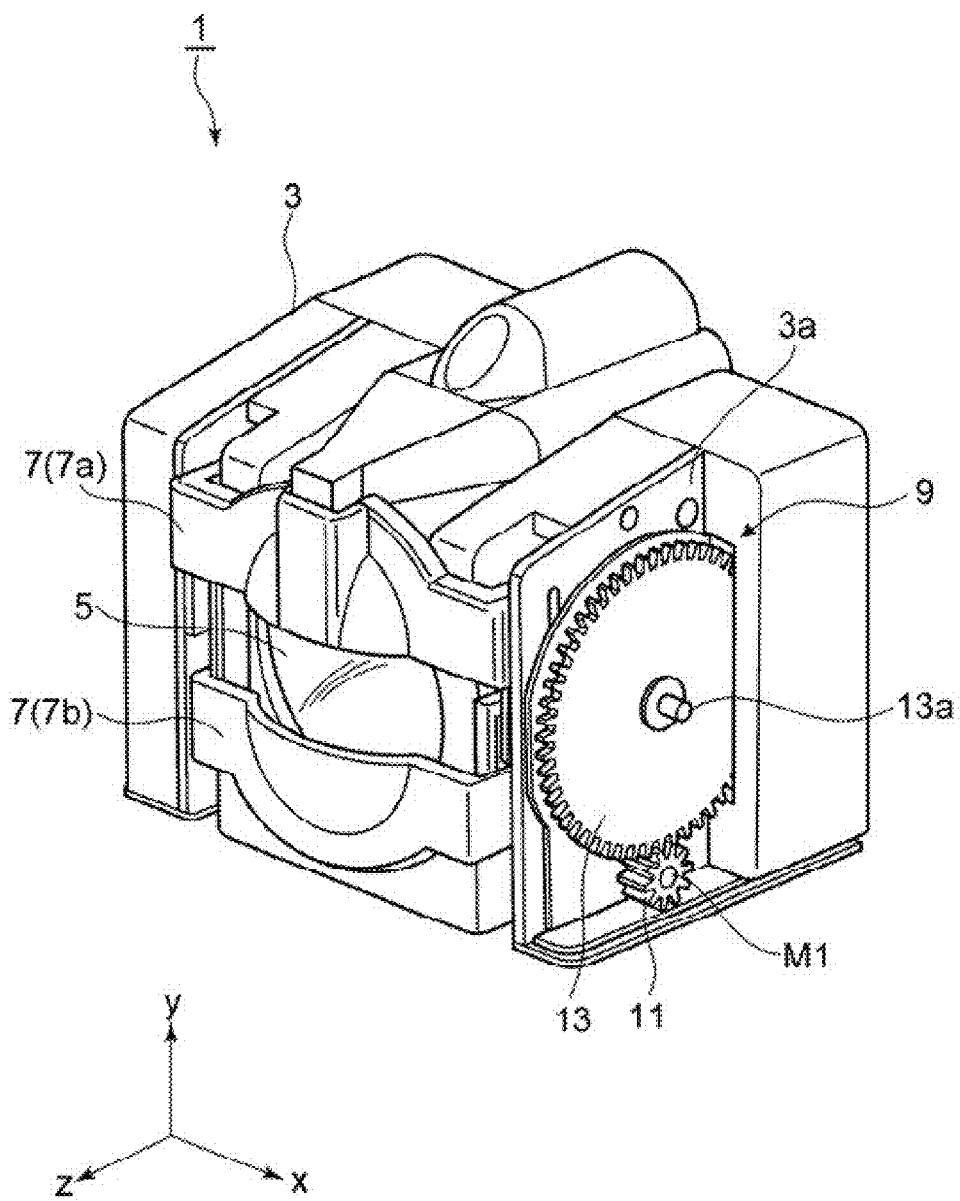
FIG. 1 is a perspective view of a camera apparatus according to an example of the present disclosure.
Figure 2:
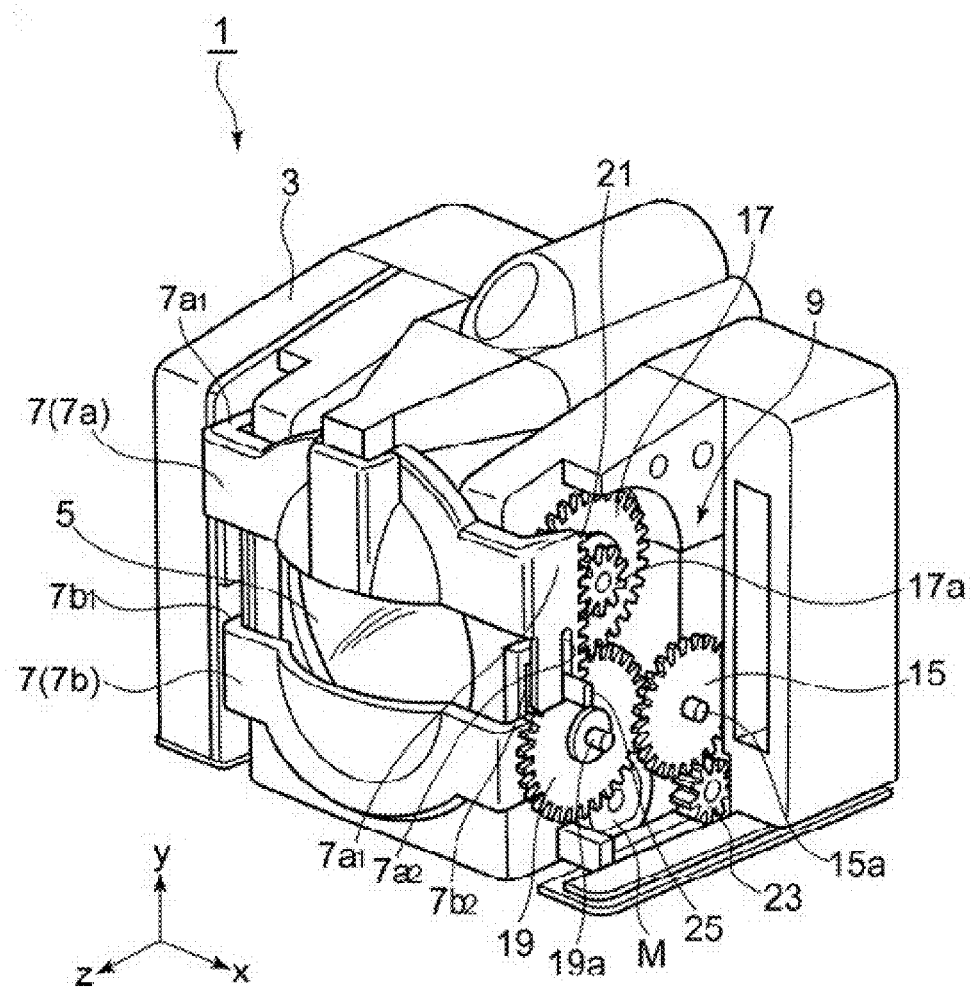
FIG. 2 is a view illustrating a state where some of the components of the camera apparatus are further removed from the state illustrated in FIG. 1.

FIGS. 1 and 2 are perspective views of an imaging apparatus 1 of this implementation. The imaging apparatus 1 includes a housing 3 that houses various components including optical components such as a photo-receiving element for capturing images. The housing 3 includes a base member, and a cover member fixed to the base member and covering the various components. Note that, FIG. 1 illustrates a state where the cover member is partially removed from the housing 3, and FIG. 2 illustrates a state where some of the components are further removed from the state illustrated in FIG. 1. Hereinafter, an x-direction illustrated in FIGS. 1 and 2 indicates a width direction of the imaging apparatus 1, a y-direction indicates a height direction of the imaging apparatus 1, and the z-direction indicates a rear-to-front direction of the imaging apparatus 1.

A transparent member 5 comprised of a convex lens, which is a wide-angle (wide-field angle) lens in this implementation, is fixed in the housing 3. The transparent member 5 is disposed on a front face of the photo-receiving element housed inside the housing 3, and is configured to introduce light into the photo-receiving element through the transparent member 5. Note that, although a case where the transparent member 5 is comprised of the convex lens is described herein, the shape of the transparent member 5 may be, but not particularly limited to, a flat shape, as long as the light can be introduced into the photo-receiving element.

Further, the housing 3 is provided with one or more movable bodies 7 which are slidable in the height directions of the imaging apparatus 1. In this implementation, although one movable body located relatively higher is denoted as 7a, and the other movable body located lower is denoted as 7b, the number and moving directions of the movable bodies 7 are not particularly limited.

The movable bodies 7a and 7b are disposed spaced apart from a front face of the transparent member 5 with a gap. The movable bodies 7a and 7b are movable between a covering position where the front face of the transparent member 5 is covered and an evacuated position where the movable bodies 7a and 7b are evacuated from the front face of the transparent member 5 with respect to the covering position. Specifically, when the movable bodies 7a and 7b approach each other and reach the covering position, the front face of the transparent member 5 is entirely covered by the movable bodies 7a and 7b, which cuts passing (transmission) of light into the photo-receiving element. On the other hand, when the movable bodies 7a and 7b separate from each other and reach the evacuated position, the front face of the transparent member 5 is exposed outside, which allows the passing (transmission) of the light into the photo-receiving element.

The housing 3 houses a movable body motor M for moving the movable bodies 7a and 7b. A driving force of the movable body motor M is transmitted to the movable bodies 7a and 7b through a transmission mechanism 9. Specifically, the transmission mechanism 9 includes a pinion 11 and a transmission gear 13, as illustrated in FIG. 1. In the housing 3, a pair of partitioning plates 3a are fixed, and the pinion and the transmission gear 13 are located outwardly from one of the partitioning plates 3a (in FIG. 1, right side) in the width direction of the imaging apparatus 1. A motor shaft M1 of the movable body motor M penetrates through the right-side partitioning plate 3a and protruded outside in the width direction of the imaging apparatus 1. The pinion 11 is fixed to the protruded tip portion of the motor shaft M1. Further, the transmission gear 13 is fixed to a rotational shaft 13a which penetrates the right-side partitioning plate 3a and is rotatably supported by the housing 3. The transmission gear 13 meshes with the pinion 11. Therefore, when the movable body motor M is driven, the pinion 11 and the transmission gear 13 rotate together by a rotational force of the movable body motor M.

The transmission mechanism 9 also includes, although only the right-side is illustrated in FIG. 2, a set of a drive gear 15, an upper open-close gear 17, a lower open-close gear 19, a rack 21, and a coupling gear 23 on the left and right sides, respectively, and each set is located inward from the respective partitioning plates 3a in the width direction of the imaging apparatus 1. The drive gear 15, the upper open-close gear 17, and the lower open-close gear 19, are respectively fixed to rotational shafts 15a, 17a, and 19a, respectively, which are rotatably bridged between the base member and the left and right partitioning plates 3a.

Note that, as illustrated in FIG. 2, the upper open-close gear 17 includes a larger diameter gear part and a smaller diameter gear part each having different numbers of teeth. Similarly, the drive gear 15 and the lower open-close gear 19 have a larger diameter gear part and a smaller diameter gear part. Note that, the smaller diameter gear parts of the drive gear 15 and the lower open-close gear 19 are positioned inward in the width direction of the imaging apparatus 1 from their larger diameter gear parts and, thus, illustrations thereof are omitted in FIG. 2. The larger diameter gear part of the drive gear 15 meshes with the coupling gear 23, and the smaller diameter gear part of the drive gear 15 meshes with the larger diameter gear part of the lower open-close gear 19. The larger diameter gear part of the lower open-close gear 19 meshes with the larger diameter gear part of the upper open-close gear 17.

Further, although not illustrated in FIG. 2, gears are provided which are fixed to the rotational shaft 13a of the transmission gear 13 and mesh with the respective larger diameter gear parts of the drive gears 15. Therefore, as the transmission gear 13 rotates, the gears (not illustrated) fixed to the rotational shaft 13a integrally rotates with the rotational shaft 13a, and the left and right drive gears 15 that mesh with the respective gears rotate as well. By this, the coupling gears 23 that mesh with the larger diameter gear parts of the drive gears 15 rotate, the lower open-close gears 19 that mesh with the smaller diameter gear parts of the drive gears 15 rotate, and the upper open-close gears 17 that mesh with the lower open-close gears 19 also rotates together with the lower open-close gears 19.

Further, the movable body 7a is provided with guide portions $7a_1$ on both end portions in the width directions of the imaging apparatus 1 by being bent in the height direction (downwardly) of the imaging apparatus 1, and the movable body 7b is provided with guide portions $7b_1$ on both end portions in the width directions of the camera apparatus 1 by being bent in the height direction (upwardly) of the imaging apparatus 1. Elongated guide holes $7a_2$ and elongated guide holes $7b_2$ extending in the height directions of the imaging apparatus 1 are formed in the guide portions $7a_1$ and the guide portions $7b_1$, respectively. Guide pins 25 are inserted in the guide holes $7a_2$ and the guide holes $7b_2$. Thus, the movable bodies 7a and 7b are movable in the height directions of the imaging apparatus 1, while being guided by the guide pins 25.

Racks 21 constituting the transmission mechanism 9 are formed in the guide portions $7a_1$ and $7b_1$. The racks 21 mesh with the smaller diameter gear portions of the upper open-close gears 17 and the lower open-close gears 19. More specifically, the racks 21 formed in the guide portions $7a_1$ of the movable body 7a mesh with the smaller diameter gear parts of the upper open-close gears 17, and the racks 21 formed in the guide portions $7b_1$ of the movable body 7b mesh with the smaller diameter gear parts of the lower open-close gears 19. Thus, the movable bodies 7a and 7b moves between the covering position and the evacuated position according to the rotations of the upper open-close gears 17 and the lower open-close gears 19.

Figure 3A:
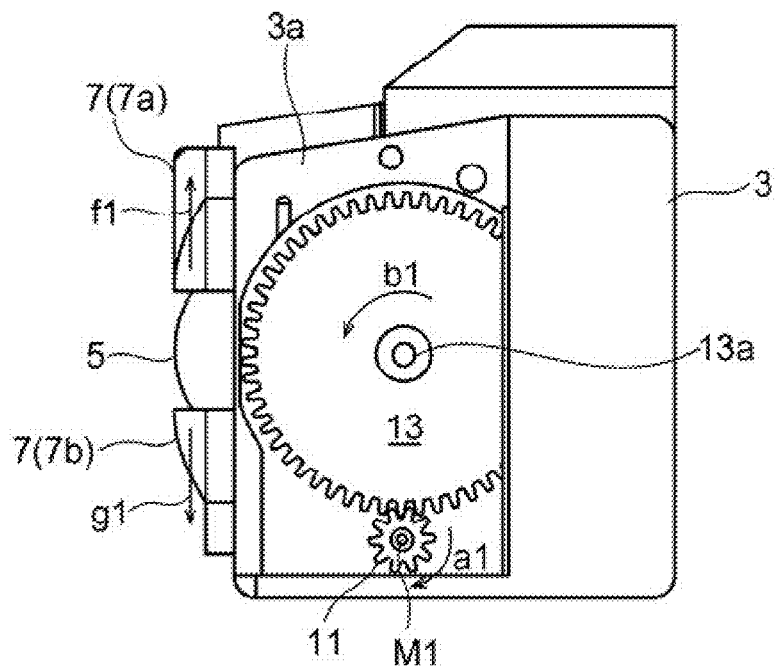
FIGS. 3A and 3B are views illustrating a power transmission when a movable body moves from a covering position to an evacuated position.
Figure 3B:
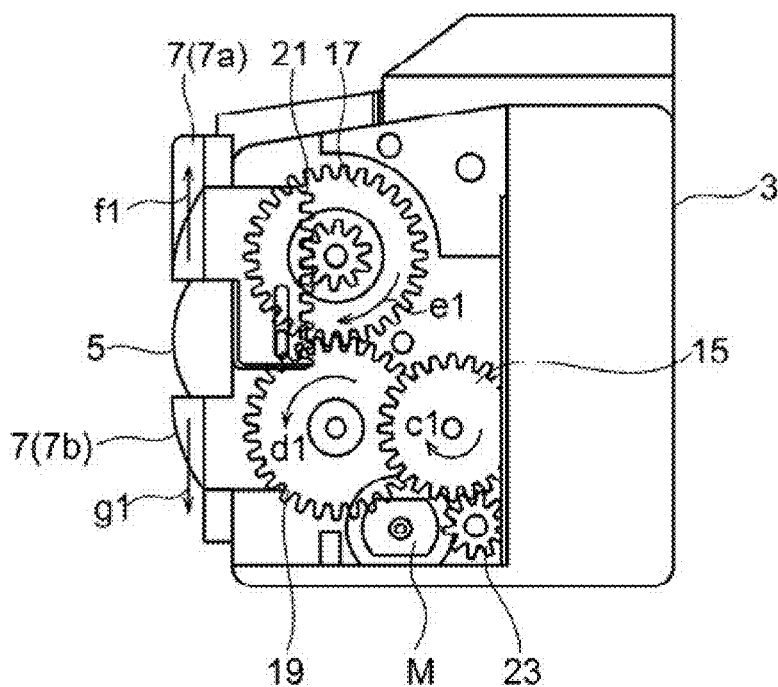
Figure 4A:
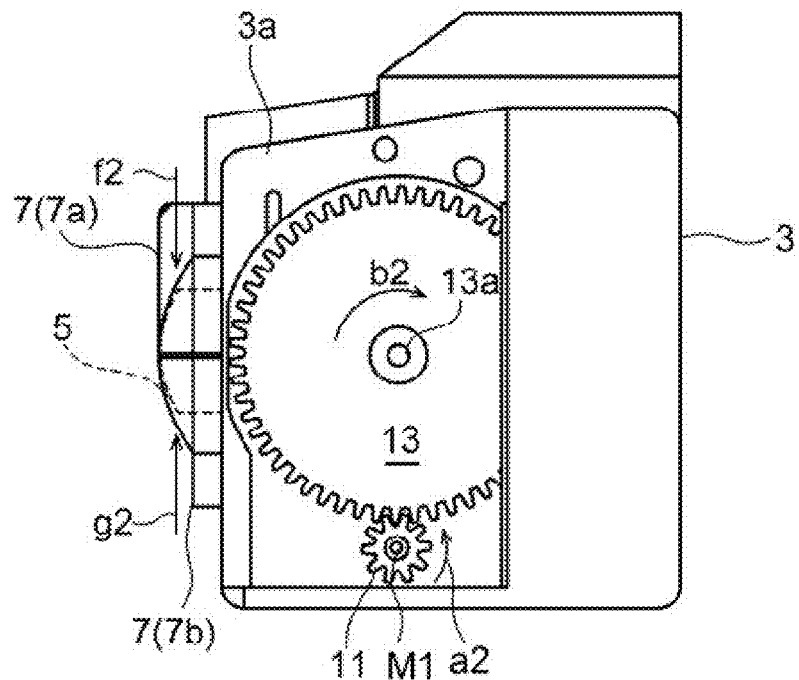
FIGS. 4A and 4B are views illustrating a power transmission when the movable body moves from the evacuated position to the covering position.
Figure 4B:
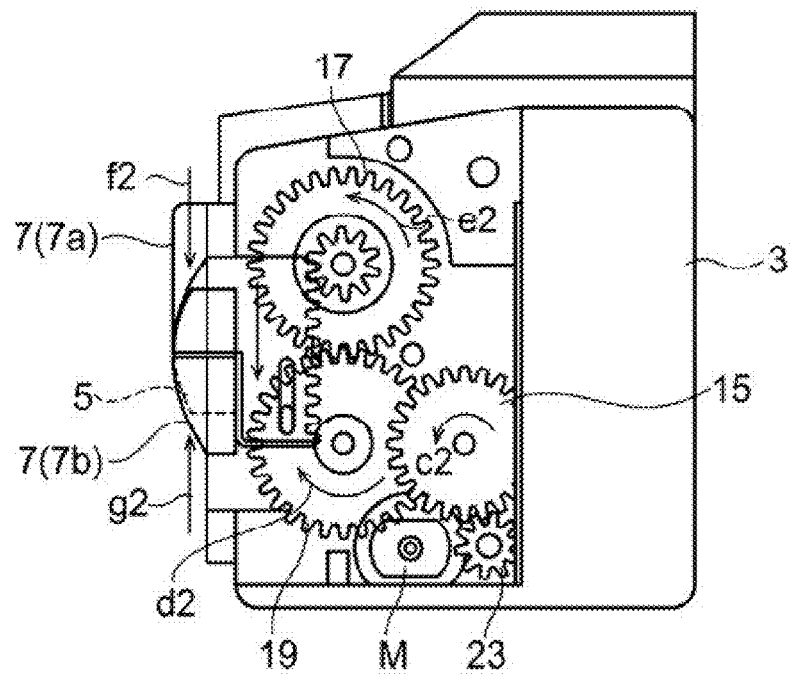

FIGS. 3A and 3B are views illustrating a power transmission when the movable bodies 7 move from the covering position to the evacuated position, and FIGS. 4A and 4B are views illustrating a power transmission when the movable bodies move from the evacuated position to the covering position. For example, when the movable bodies 7a and 7b move from the covering position to the evacuated position, the movable body motor M drives the pinion 11 to rotate in an arrow a1 direction illustrated in FIG. 3A. Then, the transmission gear 13 rotates in an arrow b1 direction according to the rotation of the pinion 11, and the rotational shaft 13a is integrally rotated in the arrow b1 direction with the rotation of the transmission gear 13. As the rotational shaft 13a rotates in the arrow b1 direction, the gears fixed to the rotational shaft 13a and meshed with the larger diameter gear parts of the drive gears 15 also rotate in the arrow b1 direction, and thereby, as illustrated in FIG. 3B, the drive gears 15 rotate in an arrow c1 direction. As the drive gears 15 rotate in the arrow c1 direction, the lower open-close gears 19 meshed with the smaller diameter gear parts of the drive gears 15 rotate in an arrow d1 direction, and the upper open-close gears 17 meshed with the lower open-close gears 19 rotate in an arrow e1 direction.

Therefore, as the rotational forces of the upper open-close gears 17 are transmitted to the movable body 7a via the racks 21, the rotational forces of the lower open-close gears 19 are transmitted to the movable body 7b via the racks 21, which moves the movable body 7a in an arrow f1 direction and the movable body 7b in an arrow g1 direction. Thus, the movable bodies 7 can be moved from the covering position to the evacuated position.

On the other hand, when the movable bodies 7a and 7b moves from the evacuated position to the covering position, the movable body motor M drives the pinion 11 to rotate in an arrow a2 direction illustrated in FIG. 4A. Then, the transmission gear 13 rotates in an arrow b2 direction according to the rotation of the pinion 11, and the rotational shaft 13a is integrally rotated in the arrow b2 direction with the rotation of the transmission gear 13. As the rotational shaft 13a rotates in the arrow b2 direction, the gears fixed to the rotational shaft 13a and meshed with the larger diameter gear parts of the drive gears 15 also rotate in the arrow b2 direction, and thereby, as illustrated in FIG. 4B, the drive gears 15 rotate in an arrow c2 direction. As the drive gears 15 rotate in the arrow c2 direction, the lower open-close gears 19 meshed with the smaller diameter gear parts of the drive gears 15 rotate in an arrow d2 direction, and the upper open-close gears 17 meshed with the lower open-close gears 19 rotate in an arrow e2 direction.

Therefore, as the rotational forces of the upper open-close gears 17 are transmitted to the movable body 7a via the racks 21, and the rotational forces of the lower open-close gears 19 are transmitted to the movable body 7b via the racks 21, which moves the movable body 7a in an arrow f2 direction and the movable body 7b in an arrow g2 direction. Thus, the movable bodies 7 can be moved from the evacuated position to the covering position.

The imaging apparatus 1 with the above configuration is mainly installed in the exterior of the vehicle or the like, and is used to monitor the front, rear, or side of the vehicle. The images captured by the camera imaging 1 is utilized for assisting driver's operations in various ways, such as displaying the captured image on a monitor provided inside the vehicle or analyzing an environment outside the vehicle based on the captured image to control traveling of the vehicle. When the imaging apparatus 1 is installed in the exterior of the vehicle, water such as rain drops adheres to the transparent member 5, which may causes difficulty in accurately recognizing the environment outside the vehicle and in assisting the driver's operation.

Therefore, in this implementation, the movable bodies 7, more specifically, portions of the movable bodies 7 which oppose to the transparent member 5 at the covering position, have a higher surface wettability than the surface wettability of the transparent member 5. The movable bodies 7 evacuate water adhered to the surface of the transparent member 5 in their moving directions during a moving process of the movable bodies 7 from the covering position to the evacuated position. Hereinafter, a method of removing the water adhered to the surface of the transparent member 5 is described.

Figure 5A:
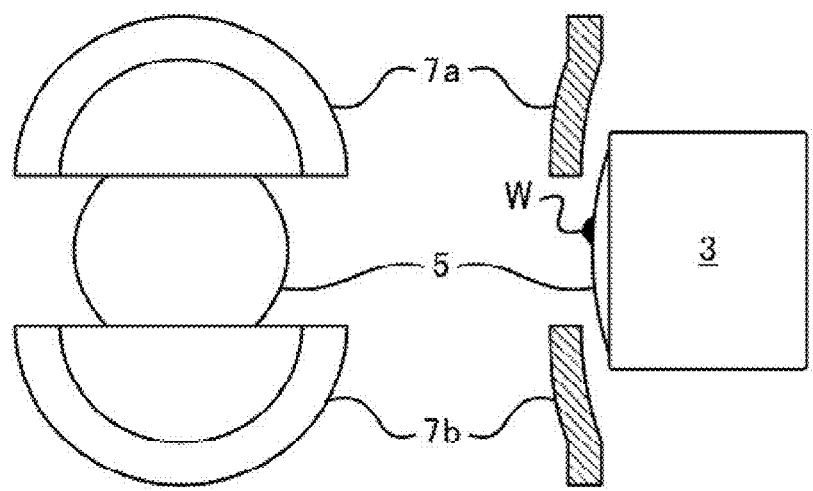
FIGS. 5A to 5C are views illustrating a method of removing water adhered to the surface of a transparent member.
Figure 5B:
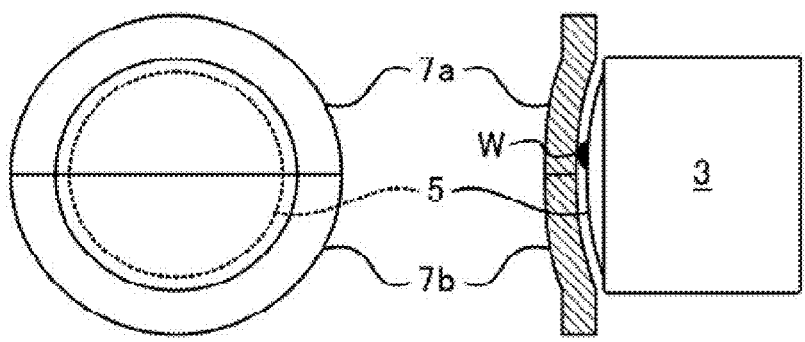
Figure 5C:
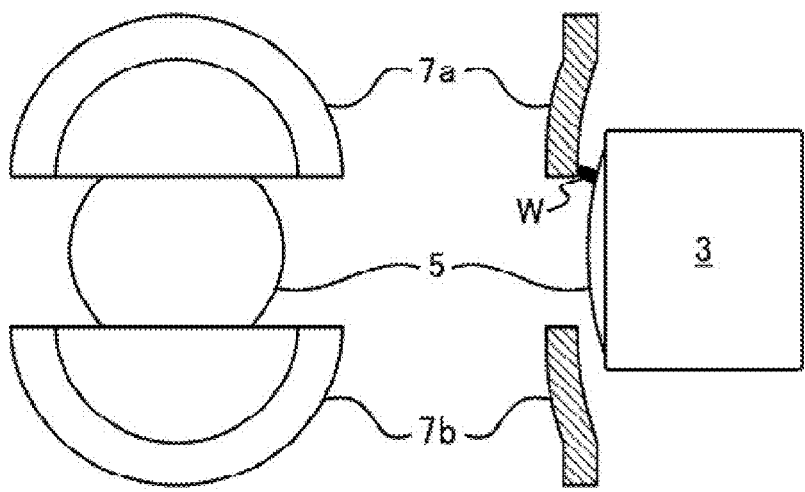

FIGS. 5A to 5C are views illustrating the method of removing water adhered to the surface of the transparent member 5. When the vehicle is traveling, normally, the movable bodies 7a and 7b are held at the evacuated position as illustrated in FIG. 5A so that the environment outside the vehicle can be monitored by the imaging apparatus 1. Here, suppose that water W is adhered to the surface of the transparent member 5. In order to remove the water W, the movable bodies 7 are moved from the evacuated position (FIG. 5A) to the covering position (FIG. 5B). At this time, the portions of the movable bodies 7 opposing to the front face of the transparent member 5 is formed in a curved shape having a substantially the same curvature as that of the transparent member 5, and a gap of about 0.3 mm is kept between the front face of the transparent member 5 and back faces of the movable bodies 7a and 7b at the covering position.

After the movable bodies 7a and 7b are moved from the evacuated position to the covering position, the movable bodies 7a and 7b are resumed from the covering position to the evacuated position. Here, since the movable bodies 7a and 7b have the higher surface wettability than the front face of the transparent member 5, the water W adhered to the surface of the transparent member 5 is pulled toward the moving directions of the movable bodies 7a and 7b during the moving process from the covering position to the evacuated position, as illustrated in FIG. 5C. Therefore, the water W adhered to the surface of the transparent member 5 can be evacuated from the front surface of the transparent member 5. Note that, as illustrated in FIG. 5C, the water W pulled upwardly by the movable body 7a runs down the surface of the transparent member 5 due to gravity, and therefore, the water W once evacuated does not adhere to the surface of the transparent member 5 again.

As above, the imaging apparatus 1 can appropriately remove the water adhered to the surface of the transparent member 5. However, for example, if the size of the water drop adhered to the surface of the transparent member 5 is smaller than the gap between the movable bodies 7 and the transparent member 5 (about 0.3 mm), or if a solid substance such as mud or sand is adhered, it is difficult to remove all kinds of these substances. Thus, hereinafter, an example application of the imaging apparatus 1 which allows the imaging apparatus 1 to appropriately remove the various adhered foreign substances is described.

Figure 6:
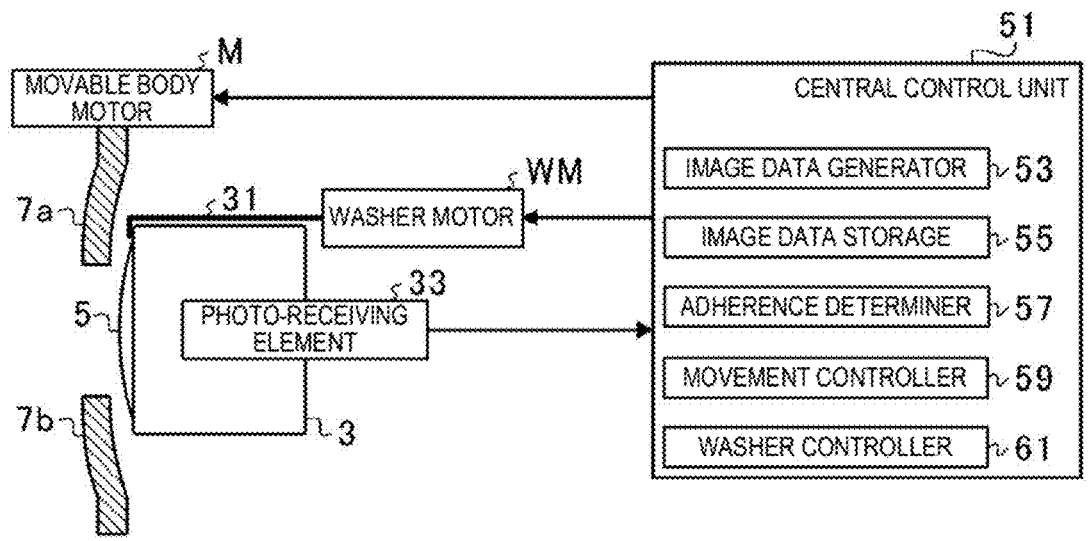
FIG. 6 is a functional block diagram illustrating an example application of the camera apparatus.

FIG. 6 is a functional block diagram illustrating the example application of the imaging apparatus 1. Here, as illustrated in FIG. 6, the imaging apparatus 1 further includes a nozzle 31 provided in an upper part of the housing 3, and a washer motor WM for sucking washer fluid reserved in a washer tank (not illustrated) and discharging it onto the front face of the transparent member 5 through the nozzle 31. A central control unit 51 controls the washer motor WM and the movable body motor M. The central control unit 51 includes an image data generator 53, an image data storage 55, an adherence determiner 57, a movement controller 59, and a washer controller 61.

The image data generator 53 generates an image data based on incident light received by a photo-receiving element 33 provided inside the housing 3, and the image data storage 55 stores the image data generated by the image data generator 53. The adherence determiner 57 determines whether any foreign substance is adhered to the transparent member 5 based on the image data stored in the data storage 55, and the movement controller 59 and the washer controller 61 control the movable body motor M and the washer motor WM, respectively, based on a determination result of the adherence determiner 57. Hereinafter, a main process of the central control unit 51 according to the removal of the adhered foreign substance is described using FIGS. 7 and 8.

Figure 7:
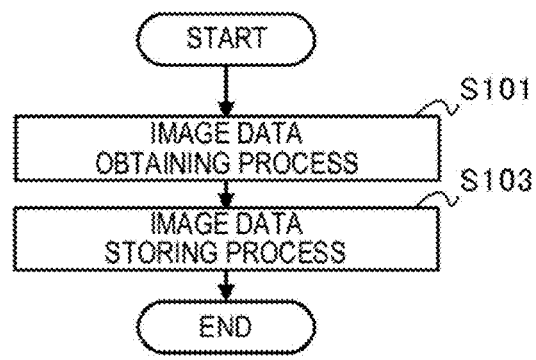
FIG. 7 is a flowchart illustrating a process of generating image data.

FIG. 7 is a flowchart illustrating a process of generating the image data by the central control unit 51. This process is to obtain image data to be used when determining whether the foreign substance is adhered to the transparent member 5, and the process is repeated throughout a certain period of time at an interval of, for example, about a few milliseconds to a few seconds.

First, the image data generator 53 generates and obtain the image data based on the incident light received by the photo-receiving element 33 (Step S101).

Next, the image data storage 55 sequentially stores the image data generated by the image data generator 53 and ends the image data generating process (Step S103).

Note that, for example, when the traveling of the vehicle is controlled based on the images captured by the imaging apparatus 1, the images are constantly obtained in the traveling control process. Therefore, in this case, as long as the captured images obtained in the traveling control is used, it is not necessary to perform a dedicated image data generating process to determine whether any foreign substance is adhered to the transparent member 5.

Figure 8:
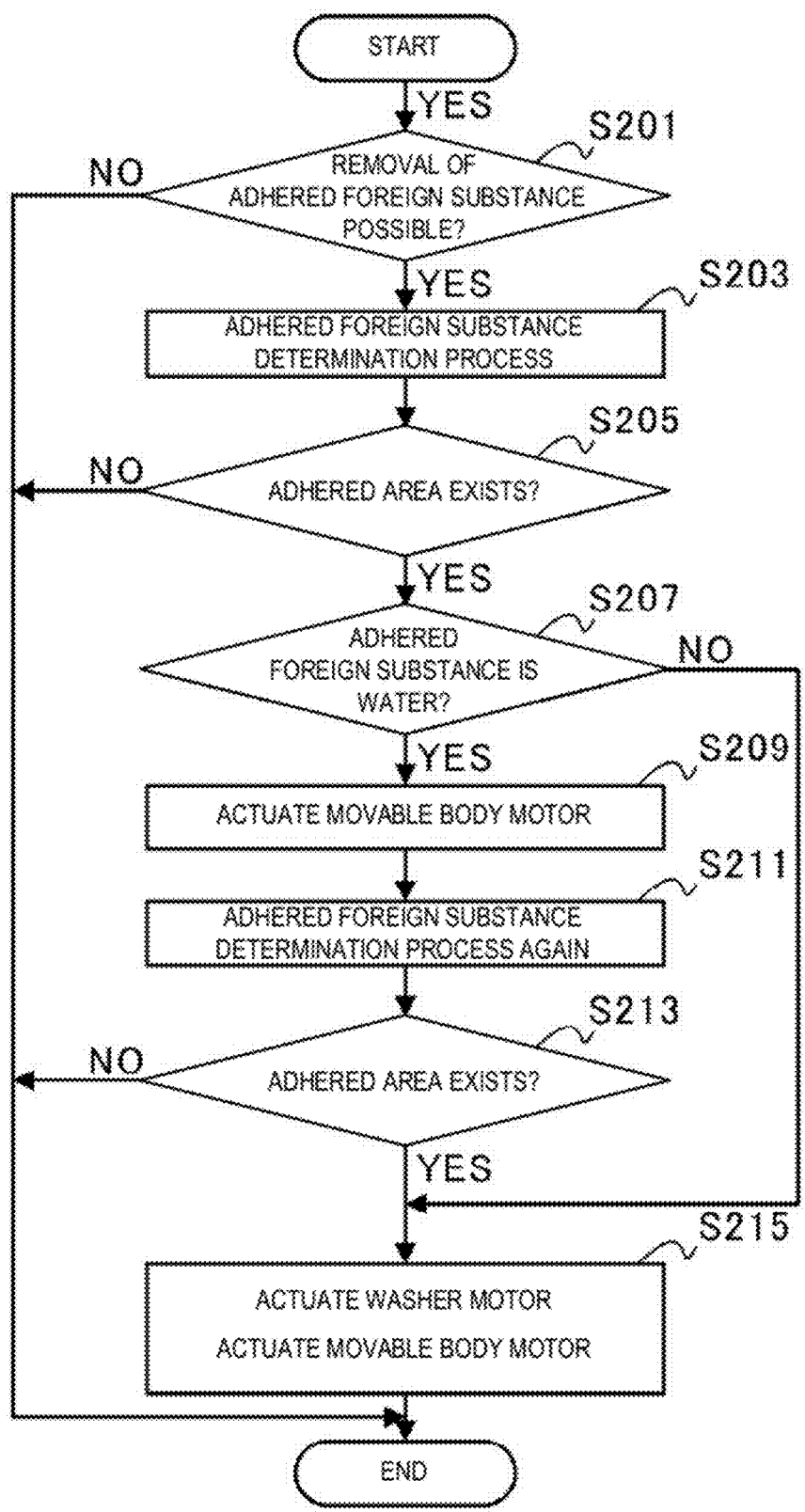
FIG. 8 is a flowchart illustrating a process of removing adhered foreign substances.

FIG. 8 is a flowchart illustrating the adhered foreign substance removal process by the central control unit 51. This process may be, for example, periodically performed at an interval from a few seconds to a few minutes, or may be performed when a preset signal is inputted into the central control unit 51. The start timing of the adhered foreign substance removal process may be suitably designed.

First, the adherence determiner 57 determines, whether the removal of the adhered foreign substance from the transparent member 5 is possible, in other words, whether any inconvenience will not occur if the adhered foreign substance is removed from the transparent member 5 (Step S201). If it is determined that the removal of the adhered foreign substance is possible, the process proceeds to Step S203, and, on the other hand, if it is determined that the removal of the adhered foreign substance is not possible, the adhered foreign substance removal process is terminated.

The adherence determiner 57 performs the adhered foreign substance determination process for determining whether the foreign substance is adhered to the transparent member 5 (Step S203). This adhered foreign substance determination process is described with reference to FIGS. 9A to 9C and 10A to 10C.

Figure 9A:
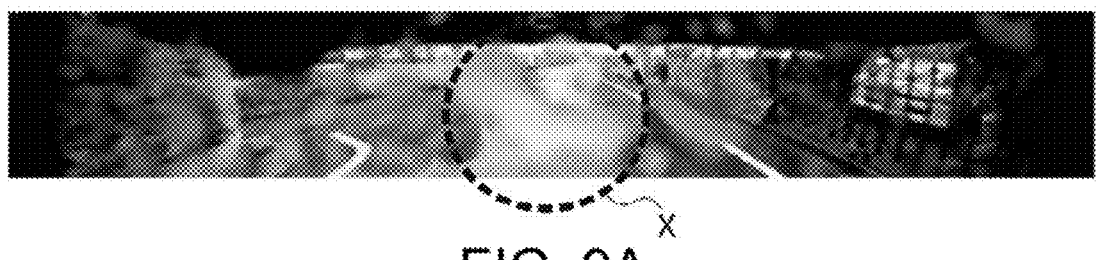
FIGS. 9A to 9C are views illustrating captured images when water is adhered.
Figure 9B:
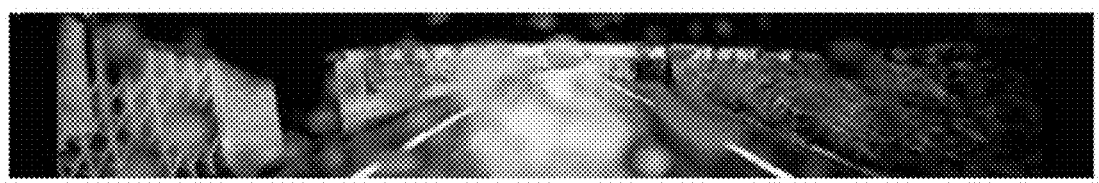
Figure 9C:
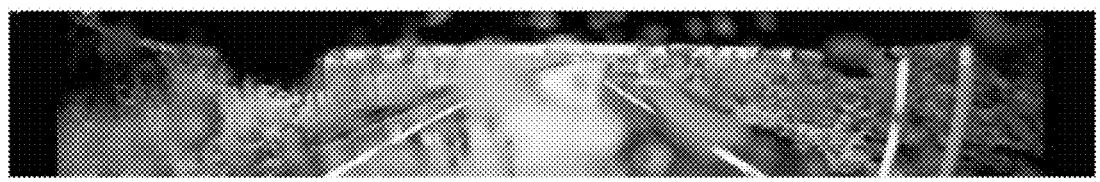
Figure 10A:
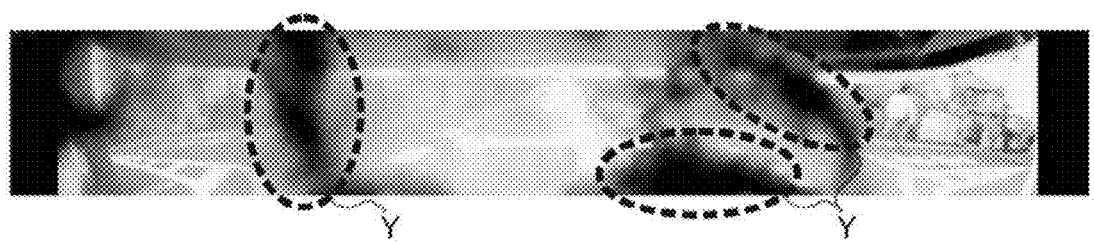
FIGS. 10A to 10C are views illustrating captured images when foreign substances are adhered.
Figure 10B:
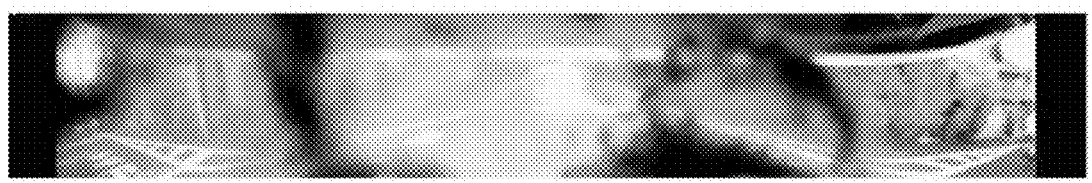
Figure 10C:
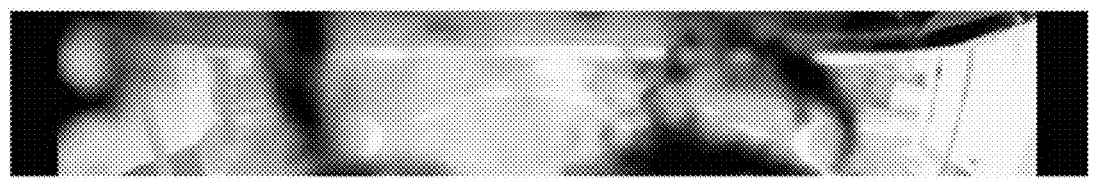

FIGS. 9A to 9C are captured images when water is adhered, and FIGS. 10A to 10C are captured images when dirt is adhered. In the adhered foreign substance determination process, the image data sequentially stored in the image data generating process is analyzed to determine whether the vehicle is in a traveling state based on the change of the image data. In FIGS. 9A to 9C and 10A to 10C, the images captured while the vehicle is traveling are sequentially illustrated in an order of FIGS. 9A, 9B and 9C, and FIGS. 10A, 10B and 10C, respectively. As clear from these images, since changes typical of the environment outside the vehicle are observed while the vehicle is traveling, it can be determined whether the vehicle is in the traveling state by analyzing the sequentially-stored image data.

On the other hand, when a water adhered area X where water such as raindrops is adhered as illustrated in FIG. 9A exists, or when dirt adhered areas Y where dirt such as sand and mud are adhered as illustrated in FIG. 10A exist, changes cannot be observed on the image data in the water adhered area X and the dirt adhered areas Y, even when the sequentially-stored image data are compared. Therefore, in the adhered foreign substance determination process, the sequentially-stored image data are analyzed, and if there are any image area where no changes are observed between the image data during a certain period of time even while the vehicle is traveling, it is determined that water or dirt is adhered.

Further, as can be understood by comparing FIGS. 9A to 9C to FIGS. 10A to 10C, the water adhered area X has a higher brightness than the dirt adhered parts Y. That is, although the water adhered part X and the dirt adhered parts Y generate no changes in the image data, they are different in brightness. Therefore, by determining the brightness of the image area where the foreign substance is adhered, it can be identified whether it is the water adhered area X or the dirt adhered area Y. Thus, in the adhered foreign substance determination process, it is determined whether the foreign substance is adhered based on the changes of the sequential image data, and if it is determined that the foreign substance is adhered, it is identified whether it is water or dirt based on the brightness of the determined area.

Returning to FIG. 8, the adherence determiner 57 determines whether the adhered area (the water adhered area X or the dirt adhered area Y) exists on the transparent member 5 based on the result of the adhered foreign substance determination process (Step S205). If it is determined that the adhered area exists, the process proceeds to Step S207, and, on the other hand, if it is determined that the adhered area does not exit, the adhered foreign substance removal process is terminated.

The adherence determiner 57 determines whether the brightness of the adhered area is higher than a predetermined threshold, in other words, whether the adhered foreign substance is water (Step S207). If the adhered foreign substance is determined as water, the process proceeds to Step S209, and, on the other hand, if it is not determined as water (which means the attached foreign substance is dirt), the process proceeds to Step S215.

The movement controller 59 causes the movable body motor M to drive the movable bodies 7 so that the movable bodies 7 move from the evacuated position to the covering position, the movable bodies 7 are then resumed from the covering position to the evacuated position (Step S209). Thus, during the process of the movable bodies 7 moving from the covering position to the evacuated position as described above, the water adhered to the surface of the transparent member 5 is evacuated from the surface of the transparent member 5.

When the movable bodies 7 are resumed to the evacuated position at Step S209, the adherence determiner 57 again performs the adhered foreign substance determination process similar to Step S203 (Step S211).

Based on the result of the repeated adhered foreign substance determination process of Step S211, the adherence determiner 57 determines whether the adhered area (the water adhered part X or the dirt adhered part Y) exists on the transparent member 5 (Step S213). If it is determined that the adhered area exists, the process proceeds to Step S215, and, on the other hand, if it is determined that the adhered area does not exist, the adhered foreign substance removal process is terminated.

The washer controller 61 causes the washer motor WM to drive so that the washer fluid is discharged to the transparent member 5, while the movement controller 59 causes the movable body motor M to drive so that the movable bodies 7 are moved from the evacuated position to the covering position, and the movable bodies 7 is then resumed from the covering position to the evacuated position (Step S215). At this time, the washer motor WM and the movable body motor M are controlled as described below.

Figure 11:
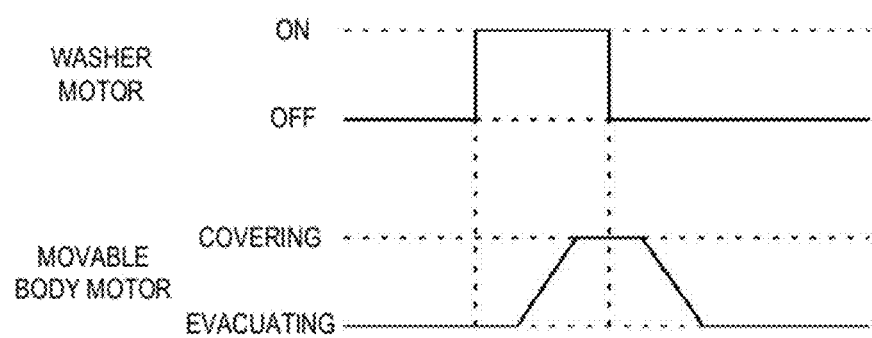
FIG. 11 is a view illustrating control timings of a washer motor and a movable body motor.

FIG. 11 is a view illustrating the control timings of the washer motor WM and the movable body motor M. At Step S215, as illustrated in FIG. 11, after the discharge of the washer fluid is started, the movable bodies 7 starts moving from the evacuated position to the covering position, and after the discharge of the washer fluid is finished, the movable bodies 7 starts moving from the covering position to the evacuated position. Thus, when the washer fluid is discharged as described above, moving the movable bodies 7 from the evacuated position to the covering position after the discharge of the washer fluid is started can reduce possibilities of biting dirt in between the transparent member 5 and the movable body 7 or the movable bodies 7, which may causes the dirt to adhere to the movable body 7 or the movable bodies 7 and damaging the transparent member 5. In addition, by the movable bodies 7 moving from the covered position to the evacuated position after the discharge of the washer fluid is finished, the washer fluid does not remain adhered to the transparent member 5, and the washer fluid can be surely removed from the transparent member 5.

According to the adhered foreign substance removal process described above, the adherence determiner 57 determines the adhered state of the foreign substance on the transparent member 5 based on the captured image, and indentifies the foreign substance as water or dirt based on the brightness of the captured image. Then, when it is determined that the water is adhered (YES at Step S207), the movable bodies 7 is resumed from the covering position to the evacuated position after the movable bodies 7 are moved from the evacuated position to the covering position (Step S209). Since the movable bodies 7 have the higher wettability than the transparent member 5, the water can be removed from the surface of the transparent member 5 by moving of the movable bodies 7.

Thus, because the water adhered to the surface of the transparent member 5 can be removed by only moving the movable bodies 7, a consumption of the washer fluid can be reduced, and the frequency of maintenance for refilling the washer fluid can be lessened. In addition, since the water can be removed by moving the movable bodies 7, and the washer fluid does not have to be used and, thus, the captured image will not be deteriorated due to the washer fluid remaining on the lens.

After moving the movable bodies 7, the adherence determiner 57 re-determines the adhered state of the foreign substance (Step S211). If the foreign substance is determined to be adhered (YES at Step S213), the washer controller 61 then discharges the washer fluid, and the movement controller 59 again moves the movable bodies 7 from the evacuated position to the covering position and then resumes the movable bodies 7 from the covering position to the evacuated position (Step S215). Therefore, if the water adhered to the transparent member 5 is smaller than the gap between the transparent member 5 and the movable bodies 7, and cannot be removed by moving the movable bodies 7, the water is then removed by the washer fluid and, thus, the water adhered to the transparent member 5 can surely be removed while the consumption of the washer fluid is lowered.

Note that, the shape, structure, material, dimension, and the like of the components of the imaging apparatus 1 in this implementation are merely examples, and needless to say, they can be suitably designed. For example, as for materials of the transparent member 5 and the movable bodies 7, the transparent member 5 may be made of glass and the movable bodies 7 may be made of an ABS resin. However, materials of both the transparent member 5 and the movable bodies 7 are not limited to these, as long as the surface wettability of the movable bodies 7 is higher than the surface wettability of the transparent member 5, and the transparent member 5 and the movable bodies 7 have a relationship that the water adhered to the surface of the transparent member 5 can be evacuated in the moving directions of the movable bodies 7 when moving from the covering position to the evacuated position.

In this implementation, by the relationship of the wettability between the transparent member 5 and the movable bodies 7, the water adhered to the transparent member 5 is removed. However, for example, portions of the movable bodies 7 that oppose to the transparent member 5 may have capillary structures, and the water adhered to the surface of the transparent member 5 can be removed by a capillary action in the moving directions of the movable bodies 7. Even if this case, the foreign substance adhered to the transparent member 5 can appropriately be removed by the adhered foreign substance removal process described above.

In this implementation, the movable bodies 7 are entirely constructed from members having a higher surface wettability than the transparent member 5. However, any other member may also be applicable as long as it has a higher surface wettability at least in a portion thereof opposing to the transparent member 5 at the covered position than the surface wettability of the transparent member 5.

Further, the method of determining the adhered state of the foreign substance described in this implementation is merely an example. As long as the adhered state of the foreign substance containing water on the front face of the transparent member 5 can be determined, the specific method is not particularly limited. Moreover, in this implementation, although the determination is made so that water or dirt can be identified, water and dirt may not necessarily be identified.

Note that, the controlling processes of the present specification are not necessarily be performed sequentially in the illustrated orders in the flowcharts, and may be performed in parallel or include one or more subroutines.

In the foregoing specification, specific implementations of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A vehicle exterior imaging apparatus, comprising:
   a photo-receiving element;
   a transparent member disposed on a front face of the photo-receiving element, the transparent member being configured to introduce light into the photo-receiving element;
   a movable body comprising an upper movable body and a lower movable body which are formed in a curved shape having a substantially the same curvature as that of the transparent member and the upper movable body and the lower movable body are movable together between a covering position in which the movable body covers part or all of a front face of the transparent member in a state where the movable body is spaced apart from the transparent member with a gap with a predetermined distance, and an evacuated position in which the movable body is evacuated from the front face of the transparent member with respect to the covering position;
   a controller configured to
      perform a first determination of an adhered state as to whether any foreign substance including water on the front face is adhered to the front face of transparent member,
      perform a removal operation to control the movable body to move from evacuated position to the covering position, and then move from the covering position to the evacuated position when the foreign substance is adhered to the front face of the transparent member, wherein the gap is maintained during the removal operation to avoid the movable body from contacting the transparent member, and
      perform a second determination of an adhered state as to whether any foreign substance including water on the front face is adhered to the front face of transparent member after the removal operation; and
   a washer is configured to discharge a washer liquid to the front face of the transparent member when a foreign substance is found after the second determination, wherein the movable body has a higher surface wettability at least in a portion thereof opposing to the transparent member at the covering position than the surface wettability of the front face of the transparent member,
   wherein the movable body evacuates water adhered to the front face of the transparent member in a moving direction of the upper movable body or the lower movable body during the movement of the movable body from the covering position to the evacuated position, and
   wherein the moving from the evacuated position to the covering position comprises the upper movable body and the lower movable body approaching each other, and the moving from the covering position to the evacuated position comprises the upper movable body and the lower movable body separating from each other.

2. The vehicle exterior imaging apparatus of claim 1, wherein the transparent member is a convex lens.

3. The vehicle exterior imaging apparatus of claim 1,
   wherein the controller is further configured to identify that the adhered foreign substance is water or dirt, and
   wherein when the controller determines that the dirt is adhered to the transparent member, the washer discharges the washer fluid, and the controller controls the movable body to move from the evacuated position to the covering position and then move from the covering position to the evacuated position.

4. The vehicle exterior imaging apparatus of claim 2, wherein the controller is further configured to identify that the adhered foreign substance is water or dirt, and
wherein when the controller determines that the dirt is adhered to the transparent member, the washer discharges the washer fluid, and the controller controls the movable body to move from the evacuated position to the covering position and then move from the covering position to the evacuated position.

5. The vehicle exterior imaging apparatus of claim 3, wherein the controller determines the adhered state of any foreign substance based on sequentially-captured images, and identifies an adhered foreign substance to be water or dirt based on a brightness of an image area where the adhered state is determined.

6. The vehicle exterior imaging apparatus of claim 4, wherein the controller determines the adhered state of any foreign substance based on sequentially-captured images image data captured sequentially, and identifies an adhered foreign substance to be water or dirt based on a brightness of an image area where the adhered state is determined.

7. The vehicle exterior imaging apparatus of claim 1, wherein when the washer fluid is discharged by the washer, the controller starts moving the movable body from the evacuated position to the covering position after the discharge of the washer fluid is started, and then moves the movable body from the covering position to the evacuated position after the discharge of the washer fluid is finished.

8. The vehicle exterior imaging apparatus of claim 2, wherein when the washer fluid is discharged by the washer, the controller starts moving the movable body from the evacuated position to the covering position after the discharge of the washer fluid is started, and then moves the movable body from the covering position to the evacuated position after the discharge of the washer fluid is finished.

9. The vehicle exterior imaging apparatus of claim 3, wherein when the washer fluid is discharged by the washer, the controller starts moving the movable body from the evacuated position to the covering position after the discharge of the washer fluid is started, and then moves the movable body from the covering position to the evacuated position after the discharge of the washer fluid is finished.

10. The vehicle exterior imaging apparatus of claim 4, wherein when the washer fluid is discharged by the washer, the controller starts moving the movable body from the evacuated position to the covering position after the discharge of the washer fluid is started, and then moves the movable body from the covering position to the evacuated position after the discharge of the washer fluid is finished.

11. The vehicle exterior imaging apparatus of claim 5, wherein when the washer fluid is discharged by the washer, the controller starts moving the movable body from the evacuated position to the covering position after the discharge of the washer fluid is started, and then moves the movable body from the covering position to the evacuated position after the discharge of the washer fluid is finished.

12. The vehicle exterior imaging apparatus of claim 6, wherein when the washer fluid is discharged by the washer, the controller starts moving the movable body from the evacuated position to the covering position after the discharge of the washer fluid is started, and then moves the movable body from the covering position to the evacuated position after the discharge of the washer fluid is finished.

13. The vehicle exterior imaging apparatus of claim 1, wherein the controller is configured, after the washer discharges the washer fluid, to control the movable body to move from evacuated position to the covering position, and then move from the covering position to the evacuated position when the foreign substance is adhered to the front face of the transparent member.

14. The vehicle exterior imaging apparatus of claim 1, wherein the movable body is configured to have no direct contact with the front face of the transparent member during the removal operation.

* * * * *